United States Patent
Fritz

(10) Patent No.: US 12,528,416 B2
(45) Date of Patent: Jan. 20, 2026

(54) METHOD FOR PROVIDING ANTI-TRAP PROTECTION FOR A MOTOR VEHICLE

(71) Applicant: Bayerische Motoren Werke Aktiengesellschaft, Munich (DE)

(72) Inventor: Florian Fritz, Oberding (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 344 days.

(21) Appl. No.: 17/795,642

(22) PCT Filed: Jan. 14, 2021

(86) PCT No.: PCT/EP2021/050649
§ 371 (c)(1),
(2) Date: Jul. 27, 2022

(87) PCT Pub. No.: WO2021/151677
PCT Pub. Date: Aug. 5, 2021

(65) Prior Publication Data
US 2023/0087776 A1     Mar. 23, 2023

(30) Foreign Application Priority Data
Jan. 28, 2020   (DE) ..................... 10 2020 101 952.1

(51) Int. Cl.
*B60R 5/04*     (2006.01)
*B60N 2/22*     (2006.01)

(52) U.S. Cl.
CPC ............... *B60R 5/047* (2013.01); *B60N 2/22* (2013.01)

(58) Field of Classification Search
CPC ........ B60R 5/047; B60N 2/22; B60N 2/0268; B60N 2002/0055; B60N 2205/35
USPC ................................................. 701/36, 45–47
See application file for complete search history.

(56) References Cited

U.S. PATENT DOCUMENTS

| | | | |
|---|---|---|---|
| 6,217,102 B1 * | 4/2001 | Lathers | B60J 7/1614 296/100.1 |
| 6,416,103 B1 * | 7/2002 | Laudenbach | B60R 5/047 160/370.22 |
| 6,702,355 B1 * | 3/2004 | Price | B60R 5/045 296/65.09 |
| 11,293,224 B2 * | 4/2022 | Pereira | E06B 9/42 |

(Continued)

FOREIGN PATENT DOCUMENTS

| | | |
|---|---|---|
| DE | 102 09 234 A1 | 9/2003 |
| DE | 102 61 777 A1 | 7/2004 |

(Continued)

OTHER PUBLICATIONS

International Search Report (PCT/ISA/210) issued in PCT Application No. PCT/EP2021/050649 dated Feb. 24, 2021 with English translation (four (4) pages).

(Continued)

*Primary Examiner* — Jonathan L Sample
(74) *Attorney, Agent, or Firm* — Crowell & Moring LLP

(57) ABSTRACT

A method provides anti-trap protection for a motor vehicle, in which a miniature safety edge is arranged on a first interior component which is movable in automated fashion relative to a second interior component by way of a control device. An automated movement of the interior components relative to one another via the control device is prevented when the miniature safety edge is actuated.

9 Claims, 3 Drawing Sheets

(56) References Cited

U.S. PATENT DOCUMENTS

| | | | | |
|---|---|---|---|---|
| 11,648,867 | B2* | 5/2023 | Petrucci | G06T 7/74 414/539 |
| 2005/0173963 | A1* | 8/2005 | Edrich | B60N 2/62 297/423.28 |
| 2008/0289544 | A1* | 11/2008 | Buitmann | A47B 9/00 108/20 |
| 2010/0327635 | A1* | 12/2010 | Whalen | B60N 2/3013 297/129 |
| 2014/0008933 | A1* | 1/2014 | Nagao | B60R 5/047 296/37.16 |
| 2015/0001874 | A1* | 1/2015 | Maier | B60R 5/045 296/37.16 |
| 2015/0291017 | A1* | 10/2015 | LaBiche | B60J 7/1204 296/100.1 |
| 2016/0325686 | A1* | 11/2016 | Krishnan | B60R 7/02 |
| 2017/0113621 | A1* | 4/2017 | Barnes | E06B 9/68 |
| 2018/0126833 | A1* | 5/2018 | Hannan | B60J 7/068 |
| 2018/0147928 | A1* | 5/2018 | Romero Regalado | B60R 19/48 |
| 2019/0009657 | A1* | 1/2019 | Carter | B60J 7/141 |
| 2019/0193536 | A1* | 6/2019 | Pompili | B60J 7/141 |
| 2019/0241053 | A1* | 8/2019 | Desai | B60J 1/14 |
| 2020/0056417 | A1* | 2/2020 | Lee | E05F 15/73 |
| 2022/0258580 | A1* | 8/2022 | Pompili | B60P 7/02 |

FOREIGN PATENT DOCUMENTS

| | | | | |
|---|---|---|---|---|
| DE | 10 2005 028 739 B3 | | 6/2006 | |
| DE | 102017213708 B3 | * | 12/2018 | B60R 21/06 |
| EP | 1 074 688 A2 | | 2/2001 | |
| EP | 1 891 872 A1 | | 2/2008 | |
| GB | 2531387 A | * | 4/2016 | B60R 21/08 |

OTHER PUBLICATIONS

German-language Written Opinion (PCT/ISA/237) issued in PCT Application No. PCT/EP2021/050649 dated Feb. 24, 2021 (five (5) pages).

German-language Office Action issued in German Application No. 10 2020 101 952.1 dated Jan. 5, 2021 (eight (8) pages).

* cited by examiner

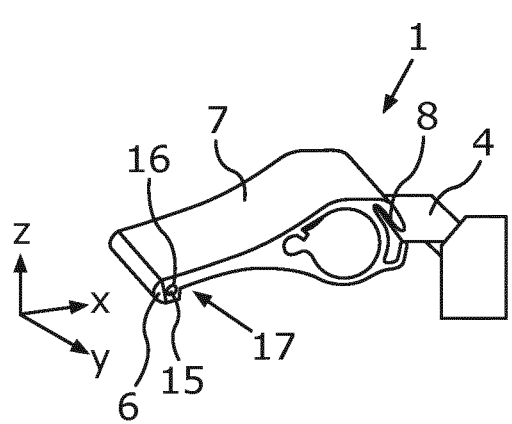
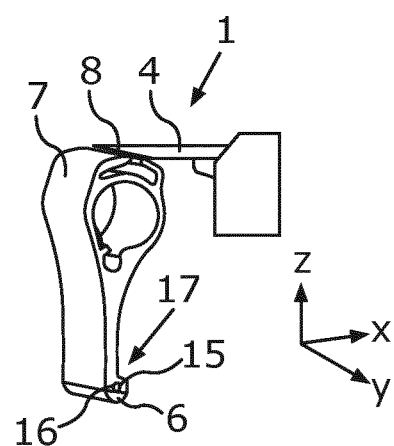
Fig.3a   Fig.3b
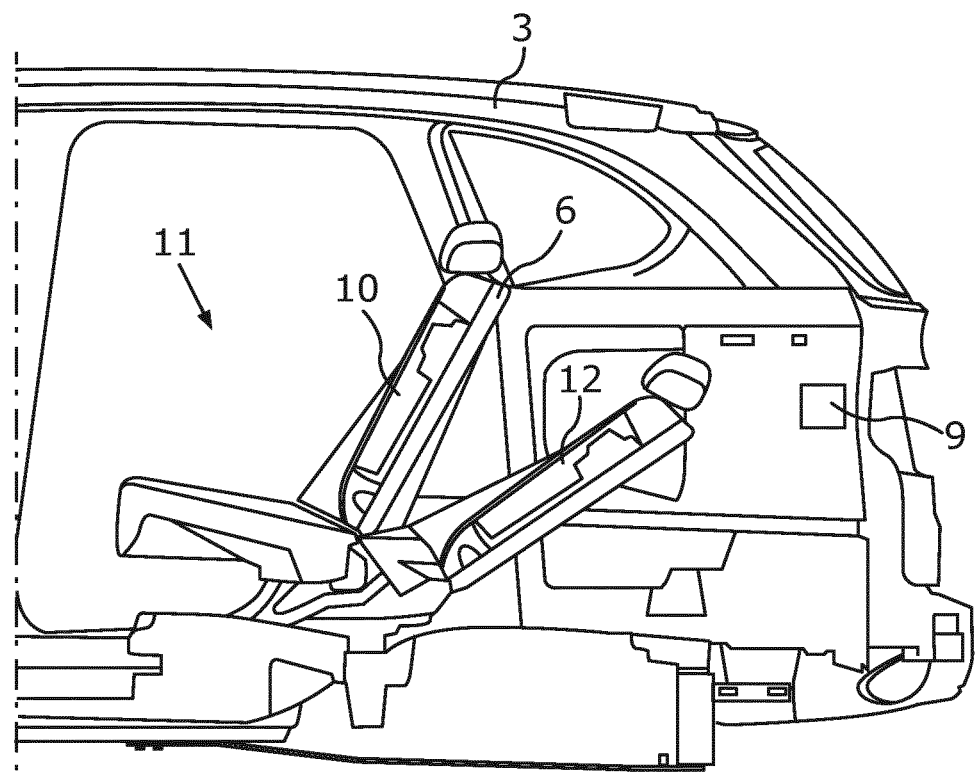
Fig.4

METHOD FOR PROVIDING ANTI-TRAP PROTECTION FOR A MOTOR VEHICLE

BACKGROUND AND SUMMARY

The invention relates to a method for providing anti-trap protection for an automobile.

A safety edge, in particular in the form of anti-trap protection for a motor vehicle, is already known from DE 10 2005 028 739 B3. This safety edge can be used on motor vehicles in the field of a window pane that can be raised and lowered and is used as a safety device to prevent objects or body parts from being trapped during the closing action of the window. The safety edge in this case can be integrated in a seal fastened to a door frame.

The problem addressed by the present invention is that of creating a method for providing anti-trap protection for an automobile which allows a particularly safe movement of two interior components of an automobile relative to one another.

This problem is solved according to the invention by a method for providing anti-trap protection for an automobile having the features of the independent claim. Advantageous embodiments of the invention are the subject matter of the dependent patent claims and the description.

The invention relates to a method for providing anti-trap protection for an automobile. The method involves a miniature safety edge being arranged on a first interior component which can be moved in automated fashion relative to a second interior component by means of a control device. An automated movement of the interior components relative to one another by means of the control device is prevented when the miniature safety edge is actuated. In other words, by means of the control device, the first interior component of the automobile is moved in automated fashion relative to the second interior component of the automobile in an interior of the automobile, when the control device receives a start signal characterizing a movement command. A movement of the interior components relative to one another by means of the control device is prevented when the control device receives a stop signal characterizing actuation of the miniature safety edge from the miniature safety edge arranged on one of the interior components. Anti-trap protection can thereby be provided in the interior of the automobile by means of the miniature safety edge. A collision between the two interior components which are movable relative to one another can therefore be detected by means of the miniature safety edge. If a collision is detected, an automated relative movement of the interior components relative to one another can be prevented. In this way, injury to a vehicle occupant and/or damage to an element trapped between the interior components which are movable relative to one another can be prevented. The miniature safety edge allows anti-trap protection for the interior of the automobile to be provided in a particularly simple, reliable and cost-effective way.

In a further embodiment of the invention, it has proved advantageous for the miniature safety edge to be arranged on an outer side of the first interior component facing the second interior component. This is particularly advantageous when the first interior component is moved towards the second interior component. In particular, the miniature safety edge in this case is arranged in the movement direction of the first interior component to the second interior component projecting as far as possible on the first interior component. During movement of the first interior component in the direction of the second interior component, the miniature safety edge would therefore come into contact with the second interior component first and only then would the first interior component come into contact with the second interior component. In this way, any trapping of the vehicle occupant and/or element between the interior components can advantageously be prevented.

In a further embodiment of the invention, it is provided that the miniature safety edge is arranged on an electrically lowerable cover blind and/or on an electrically adjustable trunk roller blind and/or on an electrically adjustable rear window blind and/or on an electrically adjustable side window blind and/or on an electrically adjustable sunroof blind and/or on an electrically adjustable seat device and/or on an electrically adjustable panoramic display device as the first interior component. Particularly with respective blinds in the interior of the automobile, it is provided that the blind is moved relative to the second interior component, which may be, in particular, a trim panel of the interior of the automobile. In this case, it must be ensured that the blind is only moved until it comes to rest against the second interior component, after which there is no further relative movement of the blind relative to the second. When the first interior component comes to rest against the second interior component, the miniature safety edge is trapped between the first interior component and the second interior component, so that a further movement of the blind relative to the trim panel by means of the control device is prevented. In particular, blinds in the interior of the automobile are moved especially frequently, wherein the miniature safety edge provides particularly reliable anti-trap protection with a particularly long service life. The miniature safety edge therefore ensures that when the blind is moved relative to the second interior component, there is no damage to the blind due to a movement of the blind towards the second interior component. In addition, it is possible to ensure by means of the miniature safety edge that neither a vehicle occupant nor an object is trapped between the blind and the second interior component. If the vehicle occupant, or a body part of the vehicle occupant, and/or an object is located between the blind and the second interior component, the miniature safety edge is pressed onto the vehicle occupant or onto the object. In this way, the miniature safety edge is compressed and as a result of this the miniature safety edge is actuated. As a consequence of the actuation of the miniature safety edge, a relative movement of the blind to the second interior component is prevented by means of the control device. When the miniature safety edge is arranged on the electrically adjustable seat device and/or on the electrically adjustable panoramic display device, it is possible to ensure that neither the vehicle occupant nor the object is trapped between the electrically adjustable seat device and the second interior component, nor between the electrically adjustable panoramic display device and the second interior component. For example, by means of the miniature safety edge, it is possible to ensure that trapping of the vehicle occupant or of the object between seats of the electrically adjustable seat device and/or between the electrically adjustable seat device and a trim panel in the interior of the automobile is prevented. Moreover, it is particularly advantageous on the miniature safety edge for the miniature safety edge to have a particularly small, and therefore particularly space-saving, design.

It has proved particularly advantageous in this context for the miniature safety edge to be arranged on a cover element when the miniature safety edge is arranged on the cover blind, and for the miniature safety edge to be oriented depending on a movement direction of the cover element relative to the cover element and/or the second interior component. This means that the miniature safety edge is set in its orientation relative to the cover element and/or the second interior component, in order to ensure that the miniature safety edge is arranged in the movement direction of the interior components relative to one another between the interior components. If a relative movement direction of the cover element relative to the second interior component is changed, the orientation of the miniature safety edge relative to the cover element and/or the second interior component can be adjusted accordingly depending on the change in the relative movement. In this way, with each relative movement and, in particular, with a change in the relative movement between the cover blind and the second interior component, anti-trap protection can be guaranteed by means of the miniature safety edge.

It has proved particularly advantageous in this context for the miniature safety edge to be arranged on a cover element of the cover blind designed as a latching element. The latching element can be locked to second interior component, wherein the miniature safety edge can be actuated during locking. In particular, the miniature safety edge is actuated during the locking of the cover device in the second interior component, as a result of which a further movement of the cover blind relative to the second interior component is prevented by means of the control device. It can therefore be ensured that during the locking of the first interior component in the second interior component, a further relative movement of the first interior component to the second interior component by means of the control device is prevented. In this case, the miniature safety edge may, for example, be arranged at the front on the latching element in the movement direction of the cover element relative to the second interior component, so that the miniature safety edge comes into contact with the second interior component during a movement of the cover element relative to the second interior component in front of the cover element. In this way it can be ensured that when the latching element is locked in the second interior component, the miniature safety edge is reliably actuated.

In order to facilitate a particularly simple arrangement of the miniature safety edge on a first interior component, it is provided according to the invention for the miniature safety edge to be connected to the first interior component via a plug-in connection. For this purpose, the miniature safety edge may have a foot which can be inserted into an undercut recess in the first interior component. In this way, a locking connection of the miniature safety edge to the first interior component can be produced. The plug-in connection allows a particularly simple and reliable connection of the miniature safety edge to the first interior component, as a result of which the miniature safety edge is held on the second interior component particularly securely.

Further features of the invention result from the claims, the figures and the figure description. The features and combinations of features referred to above in the description and also the features and combinations of features referred to in the figure description and/or shown in the figures can not only be used in the combination referred to in each case, but also in different combinations or in isolation.

The invention is explained in greater detail with the help of preferred exemplary embodiments and also with reference to the drawings.

BRIEF DESCRIPTION OF THE DRAWINGS

FIGS. 3a and 3b each show schematic perspective views of the cover element on which the miniature safety edge is arranged, wherein the cover element can be jointly oriented with the miniature safety edge relative to the blind element of the cover blind, wherein the orientation takes place depending on a movement direction of the blind element of the cover blind, as a result of which the miniature safety edge projects beyond the cover blind in the movement direction of the cover blind;

FIG. 4 is a schematic perspective view of a seat unit in an interior of the automobile, wherein the miniature safety edge is arranged on a first vehicle of the seat unit and the first vehicle seat can be moved relative to a second vehicle seat of the seat unit, as a result of which the miniature safety edge can be actuated during a movement of the first vehicle seat relative to the second vehicle seat when a vehicle occupant and/or an object is trapped between the vehicle seats and, as a result of the miniature safety edge being actuated, the relative movement of the vehicle seats relative to one another is prevented.

DETAILED DESCRIPTION OF THE DRAWINGS

Figure 1:
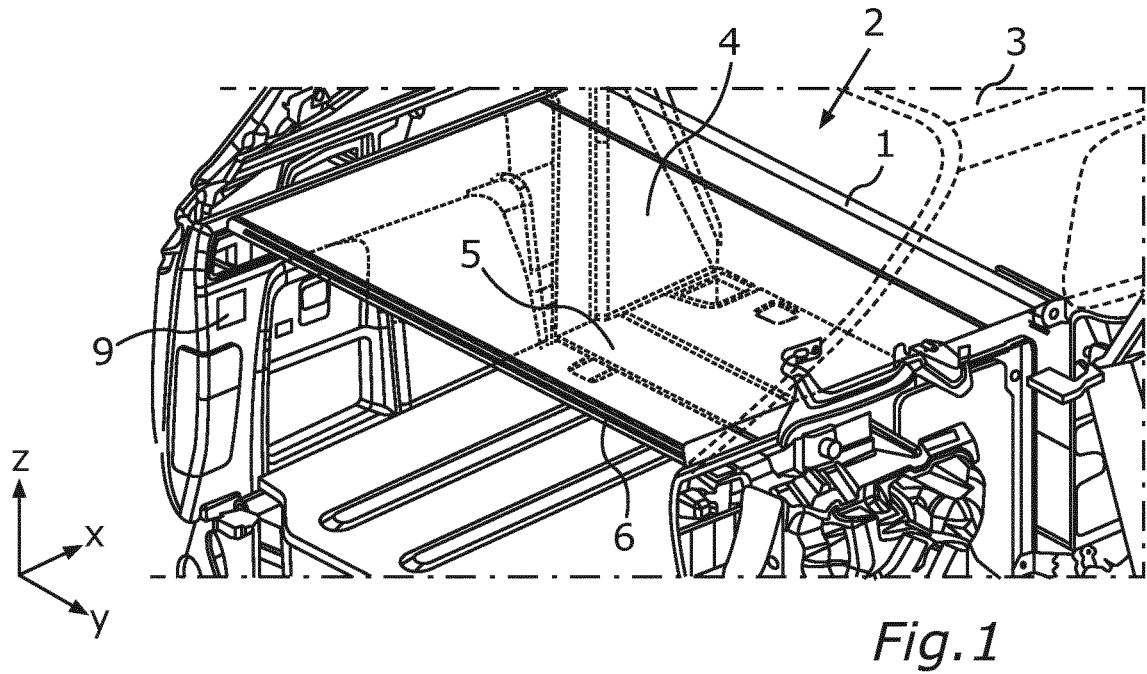
FIG. 1 is a schematic perspective view of a trunk of a vehicle, in the present case an automobile, in which an electrically lowerable blind is arranged, which can be moved along in a longitudinal vehicle direction of the automobile and can be lowered along a vertical vehicle direction of the automobile, so that it can be stowed in a floor panel element of the automobile.
Figure 2:
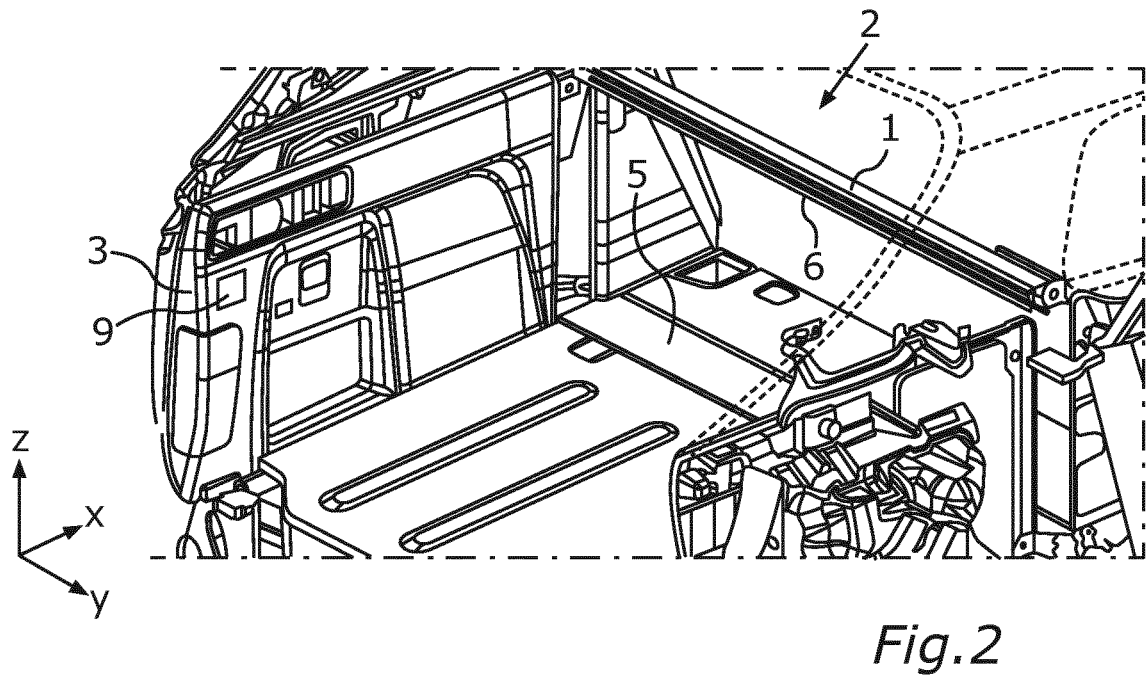
FIG. 2 is a further schematic perspective view of the trunk of the automobile with the cover blind which is arranged rolled up in the trunk of the automobile, wherein the cover blind comprises a blind element and a cover element held on the blind element, on which a miniature safety edge is arranged as anti-trap protection.

FIGS. 1 and 2 show an electrically lowerable cover blind 1 which is arranged in a trunk 2 of a motor vehicle, in particular an automobile 3. The cover blind 1 is a first interior component of the automobile 3, which can be moved within the trunk 2. As shown in FIG. 1, a blind element 4 of the cover blind 1 can be extended and retracted along a vehicle longitudinal direction x.

As depicted in FIG. 2, the cover blind 1 can be moved overall along a vertical vehicle direction z of the automobile 3, as a result of which the cover blind 1 can be arranged in the trunk 2 or stowed in or under a floor panel 5 of the automobile 3. When the blind element 4 or the entire cover blind 1 is moved within the trunk 2, a vehicle occupant and/or an object may become trapped in the trunk 2 between the cover blind 1 and a second interior component of the automobile 3, which may be a tailgate of the automobile 3 or the floor panel 5 in the present case. In order to prevent a vehicle occupant or object from becoming trapped, a miniature safety edge 6 is arranged on the electrically movable cover blind 1. The miniature safety edge 6 is a switch element which can be actuated by compression. The miniature safety edge 6 is arranged on the cover blind 1 projecting beyond the cover blind 1 in a respective movement direction of the cover bind 1. During a movement of the cover blind 1 within the automobile 3, the miniature safety edge 6 therefore comes into contact with the vehicle occupant or the object before the cover blind 1. The miniature safety edge 6 is triggered when it comes into contact with the vehicle occupant or the object. As a result of the triggering of the miniature safety edge 6, a further movement of the cover blind 1 can be prevented. In this way, anti-trap protection can be provided in an interior of the automobile 3 by means of the miniature safety edge 6.

Details of the cover blind 1 are depicted in FIGS. 3a and 3b. The cover blind 1 comprises the blind element 4 and a cover element 7 designed as the latching element. The cover element 7 is held on the blind element 4. The miniature safety edge 6 is arranged on the cover element 7. Both the miniature safety edge 6 and the cover element 7 are arranged projecting beyond the blind element 4 in the movement direction of the blind element 4. The miniature safety edge 6 is in turn arranged projecting beyond the cover element 7 in each movement direction of the blind element 4. So that this is particularly advantageously guaranteed, the cover element 7, rigidly connected to the miniature safety edge 6 in the present case, can be adjusted in its orientation relative to the blind element 4. In order to orient the cover element 7 relative to the blind element 4, the cover element 7 can be pivoted about the closing edge 8 relative to the blind element 4.

In this case, the cover element 7 is oriented to the blind element 4 depending on a respective movement direction of the blind element 4, in such a manner that the miniature safety edge 6 is arranged at the front in the movement direction of the blind element 4 or of the cover element 7. The orientation of the cover element 7 relative to the blind element 4 during a movement of the cover element 7 along the longitudinal vehicle direction x of the automobile 3 is depicted in FIG. 3b. The cover element 7 is oriented relative to the blind element 4, particularly when the blind element 4 is being unrolled, as depicted in FIG. 3a. The orientation of the cover element 7 shown in FIG. 3b is set relative to the blind element 4 when the cover blind 1 is moved along the vertical vehicle direction z and, in this case, is particularly moved to the floor panel 5, in order to stow the cover blind 1 in the floor panel 5.

The cover blind 1 can, in particular, be unrolled and rolled up, and also moved within the interior of the automobile 3, by means of an electronic control device 9 which is characterized schematically by a box in the figures. By means of the electronic control device 9, a stop signal characterizing an actuation of the miniature safety edge 6 can be received from the miniature safety edge 6. When the stop signal is received, a movement of the cover blind 1 or an unrolling or retraction of the blind element 4 by means of the electronic control device 9 is prevented. In this way, a particularly reliable operation of the cover blind 1 providing anti-trap protection is possible.

FIG. 4 shows an arrangement of the miniature safety edge 6 in a passenger compartment of the automobile 3. In this case, the miniature safety edge 6 is arranged on a first vehicle seat 10 of a vehicle seat unit 11. The vehicle seat unit 11 in the present cases comprises a further second vehicle seat 12. The first vehicle seat 10 is a first interior component of the automobile 3 and the second vehicle seat 12 is a second interior component of the automobile 3, wherein the first vehicle seat and the second vehicle seat can be automatically moved relative to one another. In particular, the vehicle seats 10, 12 can be moved relative to one another by means of the electronic control device 9. The miniature safety edge 6 in the present case is arranged on a side of a backrest of the first vehicle seat 10 facing the second vehicle seat 12. The miniature safety edge 6 is therefore triggered during a collision between the miniature safety edge 6 and a vehicle occupant and/or object arranged between the vehicle seats 10, 12. As a result of the collision of the miniature safety edge 6 with the vehicle occupant and/or the object, as a consequence of this trapping between the miniature safety edge 6 and the second vehicle seat 12, the miniature safety edge 6 is actuated and, as a consequence of the actuation of the miniature safety edge 6, a further movement of the vehicle seats 10, 12 relative to one another by means of the electronic control device 9 is prevented.

In a further embodiment not shown in the figures, the miniature safety edge 6 may extend along a transverse vehicle direction y and be arranged on a rear side of a bench seat of the automobile 3, wherein the miniature safety edge 6 is triggered when a vehicle occupant and/or an object is trapped between the miniature safety edge 6 and a tailgate of the automobile 3 when the bench seat is moved backwards in the longitudinal vehicle direction x. In this case, due to actuation of the miniature safety edge 6, movement of the bench seat by means of the electronic control device 9 can likewise be prevented.

The miniature safety edge 6 is, in particular, set up to identify a force of approx. 6 to 10 Newton acting on the miniature safety edge 6 and, as a consequence of the identification of the force, to signal its actuation for the electronic control device 9. An actuation force in each case, which must at least act on the miniature safety edge 6, in order to actuate the miniature safety edge 6, and a pickup angle of the miniature safety edge 6, can be selected through a shape of the miniature safety edge 6 and/or a material combination of elements of the miniature safety edge 6.

Figure 5:
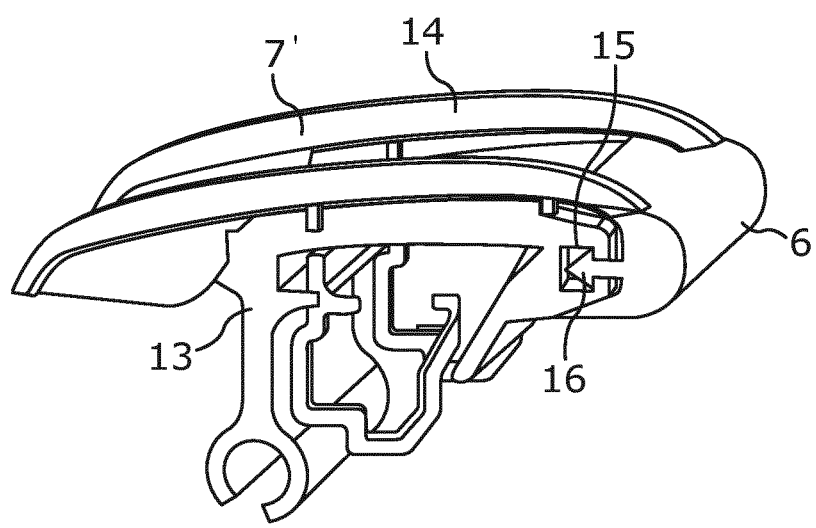
FIG. 5 is a schematic perspective view of the cover element in a different embodiment to FIGS. 3a and 3b, wherein this cover element is a component of a blind element of a sun shade, in particular.

A cover element 7' designed as an alternative to the cover elements 7 shown in FIG. 3 is depicted in FIG. 5. The cover element 7' shown in FIG. 5 is particularly suitable as a sun shade. The cover element 7' shown in FIG. 5 comprises a flap 13 and a telescopic aperture 14, which are each formed from plastic. Both in the case of the embodiment of the cover element 7 shown in FIG. 3, and also the embodiment of the cover element 7' shown in FIG. 5, the cover elements 7, 7' each have undercut recesses 15, in which the miniature safety edge 6 is inserted. The miniature safety edge 6 has a foot 16 in the present case, which can be locked in the recess 15, as a result of which the miniature safety edge 6 is held on the cover element 7 particularly easily and securely. The miniature safety edge 6 can therefore be inserted into the recess 15 by means of a plug-in connection and fastened in the recess 15 by means of the undercut.

The cover element 7 shown in FIG. 3 has a latching region 17, by means of which the cover element 7 can be locked in a second interior component of the automobile 3, in particular in a panel element of the automobile 3. The miniature safety edge 6 makes the locking of the cover element 7 in the second interior component optional, since when the miniature safety edge 6 is actuated by means of the electronic control device 9, a relative movement of the cover element 7 relative to the second interior component can be prevented, so that an unclipping function is not necessary.

The electrically lowerable cover blind 1 is permanently located in the trunk 2 of the automobile 3 and can be automatically lowered in a separate stowage compartment, in the present case behind the floor panel 5, at the customer's request. In addition, the blind element 4 of the cover blind 1 in its extended state along the longitudinal vehicle direction x may automatically retract and extend, depending on an orientation of the tailgate of the automobile 3. When there is contact of the miniature safety edge 6, in particular as a result of a blockage or a trapping incident, a contact is made within the miniature safety edge 6. Due to the making of the contact, the electronic control device 9 detects a current flow in the miniature safety edge 6 and reverses a movement of the blind element 4. Consequently, during actuation of the miniature safety edge 6, a further movement of the first interior component relative to the second interior component in the movement direction can be prevented and the first interior component can then be moved in the opposite direction relative to the second interior component.

In particular, the invention shows how miniature safety edges 6 can be used for electrical interior functions.

LIST OF REFERENCE SIGNS

1 cover blind
2 trunk
3 automobile
4 blind element
5 floor panel
6 miniature safety edge
7 cover element
8 closing edge
9 electronic control device
10 vehicle seat
11 seat unit
12 vehicle seat
13 flap
14 telescopic aperture
15 recess
16 foot
17 latching region

The invention claimed is:

1. A method for providing anti-trap protection for an automobile, comprising:
   arranging a miniature safety edge on a first interior component which is movable in automated fashion along a first vehicle longitudinal axis relative to a second interior component by way of a control device, and which is movable in automated fashion along a second vehicle vertical axis by way of the control device, the second axis being different than the first axis, and
   preventing automated movement of the first interior component, by way of the control device, when the miniature safety edge is actuated,
   wherein the miniature safety edge is arranged on a cover element when the miniature safety edge is arranged on the cover blind, the cover element being rotatable between the first axis and the second axis, and the miniature safety edge is oriented depending on a movement direction of the first component.

2. The method according to claim 1, wherein
the miniature safety edge is arranged on an outer side of the first interior component.

3. The method according to claim 1, wherein
the miniature safety edge is arranged on an electrically lowerable cover blind having an electrically adjustable trunk roller blind, as the first interior component.

4. The method according to claim 1, wherein
the miniature safety edge is arranged on the cover element of the cover blind configured as a latching element, and
the latching element is lockable to the second interior component and the miniature safety edge is actuatable during said locking.

5. The method according to claim 3, wherein
the miniature safety edge is arranged on the cover element of the cover blind configured as a latching element, and
the latching element is lockable to the second interior component and the miniature safety edge is actuatable during said locking.

6. The method according to claim 1, wherein
the miniature safety edge is connected to the first interior component via a plug-in connection.

7. The method according to claim 1, wherein:
the second axis is perpendicular to the first axis.

8. The method according to claim 3, wherein:
the electrically lowerable cover blind is movable along the second axis to a stowed position, when the electrically adjustable trunk roller blind is in a retracted position.

9. The method according to claim 1, wherein:
the first axis is a vehicle longitudinal axis, and the second axis is a vehicle vertical axis.

* * * * *